(12) United States Patent
Haque et al.

(10) Patent No.: US 11,115,662 B2
(45) Date of Patent: Sep. 7, 2021

(54) QUANTIZATION MATRIX DESIGN FOR HEVC STANDARD

(71) Applicant: SONY CORPORATION, Tokyo (JP)

(72) Inventors: Munsi Haque, San Jose, CA (US); Ali J Tabatabai, Cupertino, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/902,409

(22) Filed: Jun. 16, 2020

(65) Prior Publication Data

US 2020/0314429 A1  Oct. 1, 2020

Related U.S. Application Data

(63) Continuation of application No. 13/597,131, filed on Aug. 28, 2012, now abandoned.

(60) Provisional application No. 61/589,265, filed on Jan. 20, 2012.

(51) Int. Cl.
*H04N 19/126* (2014.01)
*H04N 19/159* (2014.01)
*H04N 19/463* (2014.01)

(52) U.S. Cl.
CPC ......... *H04N 19/126* (2014.11); *H04N 19/159* (2014.11); *H04N 19/463* (2014.11)

(58) Field of Classification Search
CPC ........................... H04N 19/126; H04N 19/463
See application file for complete search history.

(56) References Cited

U.S. PATENT DOCUMENTS

| | | | |
|---|---|---|---|
| 8,326,068 B1* | 12/2012 | Zhang | H04N 19/126 382/251 |
| 2001/0021222 A1 | 9/2001 | Shen et al. | |
| 2006/0133479 A1* | 6/2006 | Chen | H04N 19/126 375/240.03 |
| 2007/0140333 A1 | 6/2007 | Chono et al. | |
| 2008/0031325 A1 | 2/2008 | Qi | |
| 2008/0170620 A1 | 7/2008 | Zhang | |
| 2008/0175317 A1 | 7/2008 | Han et al. | |
| 2009/0034612 A1 | 2/2009 | Zheng et al. | |
| 2010/0091842 A1* | 4/2010 | Ikeda | H04N 19/61 375/240.03 |
| 2010/0158107 A1 | 6/2010 | Auyeung | |
| 2011/0206135 A1 | 8/2011 | Drugeon et al. | |
| 2012/0140815 A1* | 6/2012 | Zhou | H04N 19/184 375/240.03 |

FOREIGN PATENT DOCUMENTS

EP    2456205 A1    5/2012

OTHER PUBLICATIONS

Haque, et al., "On HVS only Default Scaling List Matrices", Joint Collaborative Team on Video Coding (JCT-VC) of ITU-T SG16 WP3 and ISO/IEC JTC1/SC29/WG11, 8th meeting, San Jose, CA, USA, JCTVC-H0461, Feb. 1-10, 2012, 05 pages.

(Continued)

*Primary Examiner* — Zhubing Ren
(74) *Attorney, Agent, or Firm* — Chip Law Group

(57) ABSTRACT

Quantization (scaling) matrices for HEVC standards using an HVS-based mathematical model and data analysis are described herein. A quadratic parameter model-based quantization matrix design is also included.

9 Claims, 13 Drawing Sheets

(56) References Cited

OTHER PUBLICATIONS

Maani, et al., "Parameterization of Default Quantization Matrices", Joint Collaborative Team on Video Coding (JCT-VC) of ITU-T SG16 WP3 and ISO/IEC JTC1/SC29/WG11, 7th meeting, Geneva, CH, JCTVC-G352, Nov. 21-30, 2011, 06 pages.

Haque, et al., "HVS Model based Default Quantization Matrices", Joint Collaborative Team on Video Coding (JCT-VC) of ITU-T SG16 WP3 and ISO/IEC JTC1/SC29/WG11, 7th meeting, Geneva, CH, JCTVC-G880, Nov. 21-30, 2011, 12 pages.

Morigami, et al., "CE4 subtest 3: Quantization matrix for HEVC based on JCTVC-F362 and F475", Joint Collaborative Team on Video Coding (JCT-VC) of ITU-T SG16 WP3 and ISO/IEC JTC1/SC29/WG11, 7th meeting, Geneva, CH, JCTVC-G434, Nov. 21-30, 2011, 10 pages.

Haque, et al., "High-level Syntaxes for the Scaling List Matrices Parameters and Parametric coding", Joint Collaborative Team on Video Coding (JCT-VC) of ITU-T SG16 WP3 and ISO/IEC JTC1/SC29/WG11, 8th meeting, San Jose, CA, USA, JCTVC-H0460, Feb. 1-10, 2012, 06 pages.

Wenger, et al., "APS Syntax and Semantics, and Parameter Set Extension Syntax", Joint Collaborative Team on Video Coding (JCT-VC) of ITU-T SG16 WP3 and ISO/IEC JTC1/SC29/WG11, 7th meeting, Geneva, CH, JCTVC-G1016r2, Nov. 21-30, 2011, 19 pages.

Non-Final Office Action for U.S. Appl. No. 13/597,131, dated Nov. 10, 2014, 10 pages.

Non-Final Office Action for U.S. Appl. No. 13/597,131, dated Feb. 4, 2016, 08 pages.

Non-Final Office Action for U.S. Appl. No. 13/597,131, dated Dec. 12, 2016, 08 pages.

Final Office Action for U.S. Appl. No. 13/597,131, dated May 27, 2015, 10 pages.

Final Office Action for U.S. Appl. No. 13/597,131, dated Apr. 15, 2016, 08 pages.

Final Office Action for U.S. Appl. No. 13/597,131, dated Apr. 14, 2017, 08 pages.

Advisory Action for U.S. Appl. No. 13/597,131, dated Jun. 23, 2016, 05 pages.

Advisory Action for U.S. Appl. No. 13/597,131, dated Jun. 16, 2017, 03 pages.

Advisory Action for U.S. Appl. No. 13/597,131, dated Sep. 6, 2018, 02 pages.

\* cited by examiner

Simulation Studies

HVS-based (qp=12)                AVC Model (spec.)

12  12  13  16                    6  13  20  28
12  13  15  19                   13  20  28  32
13  15  22  31                   20  28  32  37
16  19  31  53                   28  32  37  42

EQM AVC-HR rev.1                 AVC "Soft" HVS Models (x264)

Simulation Studies

Quadratic Model (Ref-4)          AVC Model (spec.)

12  12  13  16                   10  14  20  24
12  13  15  19                   14  20  24  27
13  15  22  31                   20  24  27  30
16  19  31  53                   24  27  30  34

EQM AVC-HR rev.1                 AVC "Soft" HVS Models (x264)

6   9  13  19                   14  14  15  16
 9  14  20  27                   14  15  16  17
13  20  28  35                   15  16  17  18
19  27  35  42                   16  17  18  19

MobilyGen (Ref-4)

Simulation Studies - HVS Models

| 16 | 17 | 20 | 25 | 16 | 16 | 16 | 16 |
|----|----|----|----|----|----|----|----|
| 16 | 16 | 17 | 21 | 17 | 16 | 17 | 17 |
| 16 | 17 | 20 | 25 | 20 | 17 | 20 | 20 |
| 16 | 17 | 20 | 25 | 25 | 21 | 25 | 25 |

Fig. 5

Simulation Studies HVS-based (qp=16)

| 16 | 16 | 16 | 16 | 16 | 16 | 16 | 16 |
|----|----|----|----|----|----|----|----|
| 16 | 16 | 16 | 16 | 16 | 16 | 17 | 18 |
| 16 | 16 | 16 | 16 | 17 | 18 | 20 | 21 |
| 16 | 16 | 17 | 18 | 20 | 22 | 24 | 25 |
| 17 | 18 | 20 | 22 | 25 | 27 | 30 | 31 |
| 18 | 19 | 22 | 25 | 29 | 34 | 38 | 44 |
| 21 | 22 | 25 | 29 | 35 | 41 | 47 | 54 |
| 24 | 25 | 29 | 36 | 47 | 65 | 88 | 115 |

MPEG-4 ASP

| 16 | 16 | 16 | 16 | 16 | 16 | 17 | 18 |
|----|----|----|----|----|----|----|----|
| 16 | 16 | 16 | 16 | 17 | 17 | 18 | 19 |
| 16 | 16 | 16 | 17 | 18 | 19 | 20 | 22 |
| 16 | 16 | 17 | 18 | 20 | 22 | 24 | 27 |
| 17 | 18 | 20 | 22 | 24 | 27 | 30 | 35 |
| 18 | 19 | 22 | 24 | 27 | 30 | 35 | 41 |
| 21 | 22 | 25 | 29 | 35 | 41 | 47 | 54 |
| 24 | 25 | 29 | 36 | 47 | 65 | 88 | 115 |

Simulation Studies HVS-based (qp=12)

| 12 | 12 | 12 | 12 | 12 | 13 | 14 | 16 | 18 |
|----|----|----|----|----|----|----|----|----|
| 12 | 12 | 12 | 12 | 13 | 14 | 16 | 19 |
| 12 | 12 | 13 | 13 | 15 | 16 | 18 | 22 |
| 12 | 13 | 13 | 15 | 18 | 20 | 23 | 27 |
| 13 | 13 | 15 | 18 | 22 | 26 | 31 | 35 |
| 14 | 15 | 16 | 20 | 26 | 33 | 41 | 48 |
| 16 | 16 | 19 | 23 | 31 | 41 | 53 | 66 |
| 18 | 19 | 22 | 27 | 35 | 48 | 66 | 86 |

EQM AVC-HR rev.1

| 6 | 7 | 8 | 10 | 12 | 14 | 16 | 18 |
|---|---|---|----|----|----|----|----|
| 7 | 9 | 11 | 13 | 15 | 16 | 18 | 20 |
| 8 | 11 | 14 | 16 | 17 | 19 | 21 | 22 |
| 10 | 13 | 16 | 18 | 19 | 21 | 24 | 26 |
| 12 | 15 | 17 | 20 | 22 | 24 | 28 | 30 |
| 14 | 16 | 19 | 22 | 25 | 29 | 34 | 38 |
| 16 | 18 | 21 | 24 | 28 | 34 | 46 | 52 |
| 18 | 20 | 22 | 26 | 30 | 38 | 52 | 72 |

AVC "Soft" HVS Models (x264)

| 12 | 12 | 12 | 12 | 12 | 13 | 14 | 15 | 16 |
|----|----|----|----|----|----|----|----|----|
| 12 | 12 | 12 | 12 | 13 | 14 | 15 | 16 | 17 |
| 12 | 12 | 12 | 13 | 14 | 15 | 16 | 17 | 19 |
| 12 | 12 | 13 | 14 | 15 | 16 | 18 | 20 | 22 |
| 13 | 13 | 14 | 15 | 16 | 18 | 21 | 23 | 27 |
| 14 | 14 | 15 | 16 | 18 | 21 | 24 | 28 | 37 |
| 15 | 15 | 16 | 17 | 20 | 23 | 28 | 39 | 48 |
| 16 | 16 | 17 | 19 | 22 | 27 | 37 | 48 | 68 |

AVC Model (spec.)

| 6 | 10 | 13 | 16 | 18 | 23 | 25 | 27 |
|---|----|----|----|----|----|----|----|
| 10 | 13 | 16 | 18 | 23 | 25 | 27 | 29 |
| 13 | 16 | 18 | 23 | 25 | 27 | 29 | 31 |
| 16 | 18 | 23 | 25 | 27 | 29 | 31 | 33 |
| 18 | 23 | 25 | 27 | 29 | 31 | 33 | 36 |
| 23 | 25 | 27 | 29 | 31 | 33 | 36 | 38 |
| 25 | 27 | 29 | 31 | 33 | 36 | 38 | 40 |
| 27 | 29 | 31 | 33 | 36 | 38 | 40 | 42 |

Fig. 6

Simulation Studies

Quadratic Model (Ref-4)

| | | | | | | | |
|---|---|---|---|---|---|---|---|
| 11 | 13 | 15 | 17 | 19 | 20 | 22 | 24 |
| 13 | 15 | 17 | 19 | 20 | 22 | 24 | 25 |
| 15 | 17 | 19 | 20 | 22 | 24 | 25 | 27 |
| 17 | 19 | 20 | 22 | 24 | 25 | 27 | 29 |
| 19 | 20 | 22 | 24 | 25 | 27 | 29 | 30 |
| 20 | 22 | 24 | 25 | 27 | 29 | 30 | 31 |
| 22 | 24 | 25 | 27 | 29 | 30 | 31 | 33 |
| 24 | 25 | 27 | 29 | 30 | 31 | 33 | 34 |

AVC Model (spec.)

| | | | | | | | |
|---|---|---|---|---|---|---|---|
| 9  | 13 | 15 | 17 | 19 | 21 | 22 | 24 |
| 13 | 15 | 17 | 19 | 21 | 22 | 24 | 25 |
| 15 | 17 | 19 | 21 | 22 | 24 | 25 | 27 |
| 17 | 19 | 21 | 22 | 24 | 25 | 27 | 28 |
| 19 | 21 | 22 | 24 | 25 | 27 | 28 | 30 |
| 21 | 22 | 24 | 25 | 27 | 28 | 30 | 32 |
| 22 | 24 | 25 | 27 | 28 | 30 | 32 | 33 |
| 24 | 25 | 27 | 28 | 30 | 32 | 33 | 35 |

MobilyGen Luma (Ref-4)

| | | | | | | | |
|---|---|---|---|---|---|---|---|
| 9  | 13 | 15 | 17 | 19 | 21 | 22 | 24 |
| 13 | 13 | 17 | 19 | 21 | 22 | 24 | 25 |
| 15 | 17 | 19 | 21 | 22 | 24 | 25 | 27 |
| 17 | 19 | 21 | 22 | 24 | 25 | 27 | 28 |
| 19 | 21 | 22 | 24 | 25 | 27 | 28 | 30 |
| 21 | 22 | 24 | 25 | 27 | 28 | 30 | 32 |
| 22 | 24 | 25 | 27 | 28 | 30 | 32 | 33 |
| 24 | 25 | 27 | 28 | 30 | 32 | 33 | 35 |

EQM AVC-HR rev.1

| | | | | | | | |
|---|---|---|---|---|---|---|---|
| 8  | 9  | 10 | 12 | 14 | 16 | 19 | 21 |
| 9  | 11 | 13 | 15 | 17 | 19 | 21 | 23 |
| 10 | 13 | 16 | 18 | 20 | 22 | 23 | 25 |
| 12 | 15 | 18 | 21 | 23 | 24 | 26 | 32 |
| 14 | 17 | 20 | 23 | 25 | 27 | 33 | 40 |
| 16 | 19 | 22 | 24 | 27 | 34 | 41 | 52 |
| 19 | 21 | 23 | 26 | 33 | 40 | 53 | 64 |
| 21 | 23 | 25 | 32 | 40 | 52 | 64 | 80 |

AVC "Soft" HVS Models (x264)

| | | | | | | | |
|---|---|---|---|---|---|---|---|
| 14 | 14 | 14 | 14 | 14 | 15 | 15 | 16 |
| 14 | 14 | 14 | 14 | 15 | 15 | 16 | 17 |
| 14 | 14 | 14 | 15 | 15 | 15 | 17 | 18 |
| 14 | 14 | 15 | 15 | 16 | 16 | 18 | 19 |
| 15 | 15 | 15 | 16 | 17 | 18 | 19 | 21 |
| 15 | 15 | 16 | 17 | 18 | 20 | 22 | 26 |
| 15 | 16 | 17 | 18 | 19 | 22 | 27 | 32 |
| 16 | 17 | 18 | 19 | 21 | 26 | 32 | 44 |

Fig. 7

Quadratic Parameters (Intra)...
2048    3768    -6164    15647

| Input HVS based Intra Q-matrix | Parametric (PAR) Q-matrix (Intra) | Intra Q-matrix error (HVS - PAR) |
|---|---|---|
| 12  12  13  16 | 15  11  11  15 | -3   1   2   1 |
| 12  13  15  19 | 11  11  15  22 |  1   2   0  -3 |
| 13  15  22  31 | 11  15  22  33 |  2   0   0  -2 |
| 16  19  31  53 | 15  22  33  48 |  1  -3  -2   5 |

Quadratic Parameters (Inter)...
1536    2601    -4209    14582

| Input HVS based Inter Q-matrix | Parametric (PAR) Q-matrix (Inter) | Inter Q-matrix error (HVS - PAR) |
|---|---|---|
| 12  12  13  16 | 14  12  12  15 | -2   0   1   1 |
| 12  13  16  18 | 12  12  14  20 |  0   1   2  -2 |
| 13  16  18  27 | 12  14  20  28 |  1   2  -2  -1 |
| 16  18  27  43 | 15  20  28  39 |  1  -2  -1   4 |

Fig. 8

| Q-matrix_AVC (Intra) | Quadratic Parameters (Intra)... | Intra Q-matrix error (AVC - PAR) |
|---|---|---|
| | -256    -901    8264    5652 | |
| 6  13  20  28 | Parametric (PAR) Q-matrix (Intra) | 0   0  -1   1 |
| 13  20  28  32 | 6  13  21  27 | 0   0   1  -1 |
| 20  28  32  37 | 13  20  27  33 | -1   1   0   0 |
| 28  32  37  42 | 21  27  32  37 | 1  -1   0   0 |
| | 27  33  37  42 | |

| Q-matrix_AVC (Inter) | Quadratic Parameters (Inter)... | Inter Q-matrix error (AVC - PAR) |
|---|---|---|
| | -192    -563    5440    9907 | |
| 10  14  20  24 | Parametric (PAR) Q-matrix (Inter) | 0  -1   0   0 |
| 14  20  24  27 | 10  15  20  24 | -1   1   0   0 |
| 20  24  27  30 | 15  19  24  27 | 0   0   0  -1 |
| 24  27  30  34 | 20  24  27  31 | 0   0  -1   1 |
| | 24  27  31  33 | |

Fig. 9

HVS Model based Intra Quantization
Matrix, QM_hvs_intra 12 12 13 16
12 13 15 19
13 15 22 31
16 19 31 53

HVS Model based Inter Quantization
Matrix, QM_hvs_inter 12 12 13 16
12 13 16 18
13 16 18 27
16 18 27 43

HVS Model based Intra Quantization
Matrix, QM_hvs_intra 12 12 12 13 14 16 18
12 12 13 13 14 16 19
12 13 13 15 16 19 22
13 15 16 18 20 23 27
15 18 22 26 31 35
16 20 26 33 41 48
19 23 31 41 53 66
22 27 35 48 66 86

HVS Model based Inter Quantization
Matrix, QM_hvs_inter 12 12 12 12 13 14 15 18
12 12 12 13 14 15 18 19
12 12 13 14 15 18 19 21
12 13 14 15 18 19 21 25
13 14 15 18 19 21 25 31
14 15 18 19 21 25 31 41
15 18 19 21 25 31 41 54
18 19 21 25 31 41 54 69

HVS Model based Intra Quantization Matrix, QM_hvs_intra

| 12 | 12 | 13 | 16 |
| 12 | 12 | 13 | 16 |
| 12 | 12 | 13 | 16 |
| 12 | 12 | 14 | 17 |
| 12 | 12 | 14 | 17 |
| 12 | 12 | 14 | 17 |
| 12 | 12 | 13 | 16 |
| 12 | 12 | 13 | 16 |
| 12 | 12 | 13 | 16 |
| 12 | 12 | 13 | 16 |
| 12 | 12 | 14 | 17 |
| 12 | 12 | 14 | 17 |
| 12 | 12 | 14 | 17 |
| 12 | 12 | 13 | 16 |
| 12 | 12 | 13 | 16 |

R[m] data
0 1 2 3 3 3 2 1 0 1 2 3 3 3 2 1

⇧

HVS Model based Inter Quantization Matrix, QM_hvs_inter

| 12 | 12 | 12 | 14 |
| 12 | 12 | 12 | 14 |
| 12 | 12 | 12 | 14 |
| 12 | 12 | 13 | 15 |
| 12 | 12 | 13 | 15 |
| 12 | 12 | 13 | 15 |
| 12 | 12 | 12 | 14 |
| 12 | 12 | 12 | 14 |
| 12 | 12 | 12 | 14 |
| 12 | 12 | 12 | 14 |
| 12 | 12 | 13 | 15 |
| 12 | 12 | 13 | 15 |
| 12 | 12 | 13 | 15 |
| 12 | 12 | 12 | 14 |
| 12 | 12 | 12 | 14 |

Fig. 11

Quadratic Parameter Model (4x4 Intra)

| a | b | c | d |
|---|---|---|---|
| -0.5 | -0.5 | 7.5 | 6.0 |

Q-matrix_AVC

```
 6  13  20  28
13  20  28  32
20  28  32  37
28  32  37  42
```

Q-matrix_New

```
 6  13  19  24
13  20  25  30
19  25  30  34
24  30  34  38
```

Q-matrix error (AVC -New)

```
0  0  1  4
0  0  3  2
1  3  2  3
4  2  3  4
```

Quadratic Parameter Model (8x8 Intra)

| a | b | c | d |
|---|---|---|---|
| -0.1667 | -0.3333 | 4.1667 | 6.0 |

Q-matrix_AVC

```
 6  10  13  16  18  23  25  27
10  13  16  18  23  25  27  29
13  16  18  23  25  27  29  31
16  18  23  25  27  29  31  33
18  23  25  27  29  31  33  36
23  25  27  29  31  33  36  38
25  27  29  31  33  36  38  40
27  29  31  33  36  38  40  42
```

Q-matrix_New

```
 6  10  14  17  20  23  25  27
10  14  17  20  23  25  27  29
14  17  20  23  25  27  29  30
17  20  23  25  27  29  30  31
20  23  25  27  29  30  31  32
23  25  27  29  30  31  32  32
25  27  29  30  31  32  32  32
27  29  30  31  32  32  32  32
```

Q-matrix error (AVC -New)

Q-matrix_AVC

| 10 | 14 | 20 | 24 |
|----|----|----|----|
| 14 | 20 | 24 | 27 |
| 20 | 24 | 27 | 30 |
| 24 | 27 | 30 | 34 |

Q-matrix_New

| 10 | 15 | 20 | 24 |
|----|----|----|----|
| 15 | 20 | 24 | 27 |
| 20 | 24 | 27 | 30 |
| 24 | 27 | 30 | 32 |

Q-matrix_Ref4

| 10 | 15 | 20 | 24 |
|----|----|----|----|
| 15 | 20 | 24 | 27 |
| 20 | 24 | 27 | 31 |
| 24 | 27 | 31 | 33 |

Error-Qmatrix (AVC -New)

|  0 | -1 |  0 |  0 |
|----|----|----|----|
| -1 |  0 |  0 |  0 |
|  0 |  0 |  0 |  0 |
|  0 |  0 |  0 |  2 |

Error-Qmatrix (AVC -Ref4)

|  0 | -1 |  0 |  0 |
|----|----|----|----|
| -1 |  1 |  0 |  0 |
|  0 |  0 |  0 | -1 |
|  0 |  0 | -1 |  1 |

Q-matrix_AVC

|  9 | 13 | 15 | 17 | 19 | 21 | 22 | 24 |
|----|----|----|----|----|----|----|----|
| 13 | 15 | 17 | 19 | 21 | 22 | 24 | 25 |
| 15 | 17 | 19 | 21 | 22 | 24 | 25 | 27 |
| 17 | 19 | 21 | 22 | 24 | 25 | 27 | 28 |
| 19 | 21 | 22 | 24 | 25 | 27 | 28 | 30 |
| 21 | 22 | 24 | 25 | 27 | 28 | 30 | 32 |
| 22 | 24 | 25 | 27 | 28 | 30 | 32 | 33 |
| 24 | 25 | 27 | 28 | 30 | 32 | 33 | 35 |

Q-matrix_New (1st trial)

|  9 | 11 | 14 | 16 | 18 | 20 | 22 | 24 |
|----|----|----|----|----|----|----|----|
| 11 | 14 | 16 | 18 | 20 | 22 | 24 | 26 |
| 14 | 16 | 18 | 20 | 22 | 24 | 26 | 28 |
| 16 | 18 | 20 | 22 | 24 | 26 | 28 | 30 |
| 18 | 20 | 22 | 24 | 26 | 28 | 30 | 32 |
| 20 | 22 | 24 | 26 | 28 | 30 | 32 | 33 |
| 22 | 24 | 26 | 28 | 30 | 32 | 33 | 35 |
| 24 | 26 | 28 | 30 | 32 | 33 | 35 | 37 |

Q-matrix_Ref4

| 11 | 13 | 15 | 17 | 19 | 20 | 22 | 24 |
|----|----|----|----|----|----|----|----|
| 13 | 15 | 17 | 19 | 20 | 22 | 24 | 25 |
| 15 | 17 | 19 | 20 | 22 | 24 | 25 | 27 |
| 17 | 19 | 20 | 22 | 24 | 25 | 27 | 29 |
| 19 | 20 | 22 | 24 | 25 | 27 | 29 | 30 |
| 20 | 22 | 24 | 25 | 27 | 29 | 30 | 31 |
| 22 | 24 | 25 | 27 | 29 | 30 | 31 | 33 |
| 24 | 25 | 27 | 29 | 30 | 31 | 33 | 34 |

Error Q-matrix (AVC - New, 1st trial)

|  0 |  2 |  1 |  1 |  1 |  1 |  0 |  0 |
|----|----|----|----|----|----|----|----|
|  2 |  1 |  1 |  1 |  1 |  0 |  0 | -1 |
|  1 |  1 |  1 |  1 |  0 |  0 | -1 | -1 |
|  1 |  1 |  1 |  0 |  0 | -1 | -1 | -2 |
|  1 |  1 |  0 |  0 | -1 | -1 | -2 | -2 |
|  1 |  0 |  0 | -1 | -1 | -2 | -2 | -1 |
|  0 |  0 | -1 | -1 | -2 | -2 | -1 | -2 |
|  0 | -1 | -1 | -2 | -2 | -1 | -2 | -2 |

Error Q-matrix (AVC - Ref4)

| -2 |  0 |  0 |  0 |  0 |  1 |  0 |  0 |
|----|----|----|----|----|----|----|----|
|  0 |  0 |  0 |  0 |  1 |  0 |  0 |  0 |
|  0 |  0 |  0 |  1 |  0 |  0 |  0 |  0 |
|  0 |  0 |  1 |  0 |  0 |  0 |  0 | -1 |
|  0 |  1 |  0 |  0 |  0 |  0 | -1 |  0 |
|  1 |  0 |  0 |  0 |  0 | -1 |  0 |  1 |
|  0 |  0 |  0 |  0 | -1 |  0 |  1 |  0 |
|  0 |  0 |  0 | -1 |  0 |  1 |  0 |  1 |

Fig. 13

QUANTIZATION MATRIX DESIGN FOR HEVC STANDARD

CROSS REFERENCES TO RELATED APPLICATIONS

The present application is a continuation application of U.S. patent application Ser. No. 13/597,131, filed on Aug. 28, 2012, and claims the benefit of priority from U.S. Provisional Patent Application Ser. No. 61/589,265, filed on Jan. 20, 2012, the entire contents of which being incorporated herein by reference.

FIELD OF THE INVENTION

The present invention relates to the field of image processing. More specifically, the present invention relates to high efficiency video coding.

BACKGROUND OF THE INVENTION

High Efficiency Video Coding (HEVC), also known as MPEG-H Part 2, is a draft video compression standard, a successor to H.264/MPEG-4 AVC (Advanced Video Coding), currently under joint development by the ISO/IEC Moving Picture Experts Group (MPEG) and ITU-T Video Coding Experts Group (VCEG). MPEG and VCEG have established a Joint Collaborative Team on Video Coding (JCT-VC) to develop the HEVC standard. HEVC improves video quality and doubles the data compression ratio compared to H.264, and scales from 320×240 to 7680×4320 pixels resolution.

SUMMARY OF THE INVENTION

Quantization (scaling) matrices for HEVC standards using an HVS-based mathematical model and data analysis are described herein. A quadratic parameter model-based quantization matrix design is also included.

In one aspect, a method of implementing a quantization matrix design for high efficiency video coding programmed in a memory of a device comprises determining intra quantization matrices of square-shaped blocks and converting the intra quantization matrices of the square-shaped blocks into corresponding inter square-shaped quantization matrices. The method further comprises determining intra quantization matrices of rectangular-shaped blocks. The method further comprises converting the intra quantization matrices of the rectangular-shaped blocks into corresponding inter rectangular-shaped quantization matrices. Converting comprises using reference advanced video coding quantization matrices model-based algorithms. The intra quantization matrices are derived from contrast sensitivity functions adjustment-based algorithms. The intra quantization matrices are selected from the group consisting of 4×4, 8×8, 16×16 and 32×32. The intra quantization matrices are selected from the group consisting of 16×4, 32×8, 8×2 and 32×2. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an portable music player, a tablet computer, a video player, a DVD writer/player, a Blu-ray writer/player, a television and a home entertainment system.

In another aspect, a method of implementing a quantization matrix design for high efficiency video coding programmed in a memory of a device comprises determining intra quantization matrices of square-shaped blocks and the intra quantization matrices of rectangular-shaped blocks and converting the intra quantization matrices of the square-shaped blocks into corresponding inter square-shaped quantization matrices and the intra quantization matrices of the rectangular-shaped blocks into corresponding inter rectangular-shaped quantization matrices. Converting comprises using reference advanced video coding quantization matrices model-based algorithms. The intra quantization matrices are derived from contrast sensitivity functions adjustment-based algorithms. The intra quantization matrices are selected from the group consisting of 4×4, 8×8, 16×16 and 32×32. The intra quantization matrices are selected from the group consisting of 16×4, 32×8, 8×2 and 32×2. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an portable music player, a tablet computer, a video player, a DVD writer/player, a Blu-ray writer/player, a television and a home entertainment system.

In another aspect, an apparatus comprises a memory for storing an application, the application for determining intra quantization matrices of square-shaped blocks and converting the intra quantization matrices of the square-shaped blocks into corresponding inter square-shaped quantization matrices and a processing component coupled to the memory, the processing component configured for processing the application. The apparatus further comprises determining intra quantization matrices of rectangular-shaped blocks. The apparatus further comprises converting the intra quantization matrices of the rectangular-shaped blocks into corresponding inter rectangular-shaped quantization matrices. Converting comprises using reference advanced video coding quantization matrices model-based algorithms. The intra quantization matrices are derived from contrast sensitivity functions adjustment-based algorithms. The intra quantization matrices are selected from the group consisting of 4×4, 8×8, 16×16 and 32×32. The intra quantization matrices are selected from the group consisting of 16×4, 32×8, 8×2 and 32×2. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an portable music player, a tablet computer, a video player, a DVD writer/player, a Blu-ray writer/player, a television and a home entertainment system.

BRIEF DESCRIPTION OF THE DRAWINGS

FIG. 3 illustrates comparative Q-matrices (intra 4×4) according to some embodiments.

FIG. 4 illustrates comparative Q-matrices (inter 4×4) according to some embodiments.

FIG. 5 illustrates comparative Q-matrices (intra 4×4) DCT/DST or DST/DCT according to some embodiments.

FIG. 6 illustrates comparative Q-matrices (intra 8×8) according to some embodiments.

FIG. 7 illustrates comparative Q-matrices (inter 8×8) according to some embodiments.

FIG. 8 illustrates 4×4 HVS Q-matrices generated using quadratic parameters according to some embodiments.

FIG. 9 illustrates 4×4 HVS Q-matrices generated using quadratic parameters according to some embodiments.

FIG. 11 illustrates intra and inter Q-matrices (16×4) according to some embodiments.

FIG. 12 illustrates results for intra quadratic models according to some embodiments.

FIG. 13 illustrates results for inter quadratic models according to some embodiments.

DETAILED DESCRIPTION OF THE PREFERRED EMBODIMENT

Figure 1:
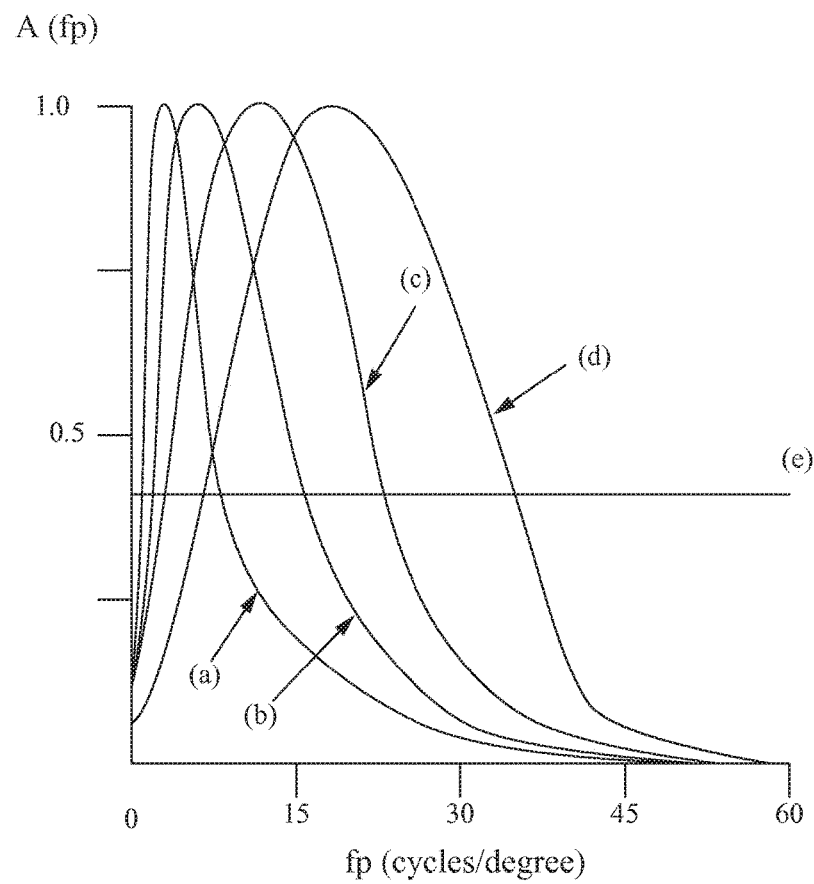
FIG. 1 illustrates Modular Transfer Function (MTF) curves at different peak frequencies according to some embodiments.

Designs for Quantization (scaling) matrices for High Efficiency Video Coding (HEVC) standards by using a Human Visual System (HVS)-based mathematical model and subsequent data analysis are described herein. A quadratic parameter model-based quantization matrix (Q-matrix) design is also described.

The quantization matrix design for HEVC standards includes an HVS-based mathematical model and a quadratic parameter model. Intra Q-matrices of square-shaped blocks or rectangular-shaped blocks for HEVC standards are also included. The intra square-shaped or rectangular-shaped Q-matrices are converted into corresponding inter square-shaped or rectangular-shaped Q-matrices using reference AVC Q-matrices model-based algorithms. For the HVS model, intra Q-matrices are derived from the contrast sensitivity functions adjustment-based algorithms. For quadratic parameter Q-matrix design, a set of quadratic parameters list is derived from referenced input Q-matrices from HVS models or reference AVC Q-matrices model and subsequently used for generating quadratic model based Q-matrices. Then, the intra Q-matrices are converted into corresponding inter Q-matrices using the results derived from the AVC Q-matrix analysis.

To convert the Intra Q-matrices into the corresponding Inter Q-matrices, the results derived from AVC Q-matrix analysis that show that there are simple relationships that exist between Intra and Inter models, are utilized.

There are numerous ways of storing the scaling list tables. One example is a Look-Up Table (LUT) which uses a significant amount of storage in both the encoder and decoder. In the LUT, default scaling lists are symmetric in nature. The entries of these scaling lists are the zig-zag scanned coefficients of the scaling matrices. The default scaling lists are developed using two example models. The first one is based on the HVS model and the second is designed with quadratic parameter models for symmetric scaling matrices.

Another example of storing the scaling list tables is a parametric model where tables are regenerated in the encoder and decoder at the expense of additional computations. The parameter models for scaling matrices are able to be symmetric, multi-parameters (3 to 6) or asymmetric, multi-parameters (2×3 to 6) depending upon the encoded picture/sequences. A symmetric quadratic parameter model for the default scaling list that contains 4 parameters (par_a0, par_b0, par_c0 and par_d0) for a Quadratic equation is shown:

$$q(x,y)=\text{Int}((\text{par\_}a0*(x^2+y^2)+\text{par\_}b0*(xy)+\text{par\_}c0*(x+y)+\text{par\_}d0+5123)>>10);$$

where (x, y) is the location of an element in the default scaling list (before scanning is applied).

HVS Algorithm a) In an original equation (contrast sensitivity functions adjustment):

$$H(u, v) = [c + (f(u, v)/fpeak)**k1]*\exp[-(f(u, v)/fpeak)**k2] \Rightarrow$$
$$a*[c+b*f(u, v)]*\exp[-(d*f(u, v))**k2] \Rightarrow \text{where,}$$
$$p = 1/fpeak, b = f1(p) = p**k1,$$
$$d = f2(p) = p**k2, \text{ or } b =.d, k1 = 1.0443$$

b) If (f(u,v)>fpeak)

$$H(u,v)=2.2*(0.192+0.114*f(u,v))\exp(-(0.114*f(u,v))**1.1);$$

else $$H(u,v)=1.0;$$

for u=0 to M−1, v=0 to N−1 in a M×N block, f(u,v) is the radial frequency c) Q(u, v)=Int (0.5+qp/H(u, v))); //qp=average QP value d) curves at different peak frequencies. FIG. 1 shows the Modular Transfer Function (MTF) curves at different peak frequencies according to some embodiments. The HVS is modeled as a nonlinear point transformation followed by an MTF, when assuming the HVS is isotropic. The curves are also able to be referred to as Contrast Sensitivity Function (CSF) curves for HVS models. CSF indicates how sensitive people are to the various frequencies of visual stimuli. According to CSF, people are most sensitive to middle frequencies. However, people are very insensitive to the ends of the spectrum frequencies such as very low and very high frequencies.

The HVS algorithm uses different peak frequencies (fpeak=(a), (b), (c), (d) cases) to select appropriate parameters regarding distortion measure.

TABLE 1

| | | | | | | | | |
|---|---|---|---|---|---|---|---|---|
| Varying models | | | | | | | | |
| Models | fpeak | p = 1/fpeak | a | c | b = f1(p) | d = f2(p) | k2 | comment |
| Default low-contrast | 8 | 0.125 | 2.2 | 0.192 | 0.114 | 0.114 | 1.1 | Average case |

TABLE 1-continued

Varying models

| Models | fpeak | p = 1/fpeak | a | c | b = f1(p) | d = f2(p) | k2 | comment |
|---|---|---|---|---|---|---|---|---|
| High frequency | 8 | 0.125 | 2.2 | 0.192 | 0.114 | 0.114 | 0.9 to 1.1 | Slow (edge emphasis) to rapid decay (blur) |
| Median | 6 to 8 - variable | 0.125 | 2.2 | 0.192 | 0.114 | 0.114 | | Less detail, fpeak = 6 to 8, more details 8 to 10; For u = v = 0, (a*c) = 0.422 for default, it could be as low as 0.025 |
| Low | 8 | 0.125 | 2.2 | 0.192 | 0.114 | 0.114 | | For u = v = 0, (a*c) = 0.422 for default, it could be 0.05 to 0.1 |

New Parameter Insertion

Discrete representation of horizontal and vertical frequencies $$f(u)=R(u)/(delta\_u*2M); f(v)=R(v)/(delta\_v*2N);$$

Discrete representation of horizontal and vertical frequencies $$f(u)^*=[(mH(u)/M)*(width/M)]; f(v)^*=[(mT(v)/N)*(height/N)];$$

[(mH(u)/M)*(width/M)]=H-MV in terms MB-size for all frame-width Mbs
[(mT(u)/N)*(height/N)]=V-MV in terms MB-size for all frame-height Mbs Discrete representation of horizontal and vertical frequencies:

$$f(u)=R(u)/(delta\_u*2M); f(v)=R(v)/(delta\_v*2N);$$

delta_u=dot-pitch in width direction (u) for the display terminal
delta_v=dot-pitch in height direction (v) for the display terminal
R(u)=number of sign changes in each row of the transform matrix kernel
C(v)=number of sign changes in each column of the Transform matrix kernel Express radial frequency in terms of horizontal and vertical frequencies:

$$f(u,v)=sqrt(f(u)*f(u)+f(v)*f(v));$$

Adapt to specified display resolutions:
Scale radial frequency with a viewing distance (dis) related factor, dis_factor:

$$dis\_factor=(pii/180/arcsin(1/sqrt(1+dis*dis)); pii=4.0*arctan(1.0);$$

$$f(u,v)=dis\_factor*f(u,v);$$

Normalize the latest radial frequency with an angular dependent function S(theta (u, v)) to account for variations in visual MTF:

$$theta(u,v), \text{the viewing angle}=arctan(f(v)/f(u));$$

$$S(theta(u,v))=((1-w)/2)*cos(4*theta(u,v))+(1+w)/2;$$

w=a symmetry parameter, derived from experiments=0.7;

$$f(u,v)=f(u,v)/S(theta(u,v)).$$

Initial Parameters for HVS Algorithm
Model related assumptions:
Display dot pitch (delta_u, delta_v) in mm (=0.25 for 100 dpi display).

Viewing distance (dis) in mm=4×image height (=4*128 mm for a 128 mm×128 mm display showing a 512×512 image.
fpeak=8.0 cycle/degree or 7.9.
Average qp=12 (AVC) or 16 (JPEG, MPEG-2, MPEG-4: 2, HEVC).
w=symmetry parameter, derived from experiments=0.7.

In some embodiments, a Spatio-Temporal Just Noticeable Distortion (ST-JND) model is utilized. Using a Contrast Sensitivity Function (CSF) Model, a temporal parameter is inserted. JND in video signals depends on both spatial and temporal HVS masking effects. Spatial masking is due to the following aspects: frequency representation type, luminance variations and the presence of patterns such as textured regions that boost masking effects. Temporal masking depends on motion activity present between two successive frames at the distortion is less noticeable in areas with fast movements. The ST-JND model accounts for all of these masking effects. The ST-JND model works in the DCT domain over the luminance component of each video frame, is exploited in both rate allocation and perceptual weighting of the distortion in ME and RD optimization encoding processes, provides a JND threshold for each DCT coefficient, and organizes these threshold in a matrix with the same width and height of the video frame being coded. The ST-JND model is able to utilize spatial masking component modeling, luminance variations masking, image patterns masking and temporal masking.

In some embodiments, inter Q-matrix weighting is implemented. Three different frequency weighting strategies to modulate HVS-based Q-matrix models are able to be implemented—strategy 0: no frequency weighting, strategy 1: details preserved (more high frequencies) and strategy 2: details blurred (less high frequencies). Neighboring macroblocks (A, B, C, D) contexts (coding type) are used to devise rules for current macroblocks in I/P/B pictures. Strategy 0: skip mode, Intra_16×16; strategy 1: intra4×4_DC, inter 4×4, intra_MB in P/B pictures; and P_16×16, B_16×16.

Quadratic Model for Quantization Matrix (Q-matrix)
A symmetric quadratic model for an n×n Q-matrix is given as:

$$q(x,y)=\text{unsigned char}(a(x*x+y*y)+bxy+c(x+y)+d+0.5)$$

4 parameters (a, b, c, d) for each case of Intra/Inter, 4×4/8×8, Luma/Chroma blocks
A total of 2×2×2=8 parameter-sets are used.

TABLE 2

| Model parameters | | | | |
|---|---|---|---|---|
| Inter blocks | a | b | c | d |
| 4 × 4 | −0.1875 | −0.5500 | 5.3125 | 9.6750 |
| 8 × 8 | −0.0290 | −0.0563 | 2.0712 | 10.7535 |
| 16 × 16/32 × 32 | −0.0290 | −0.0563 | 2.0712 | 10.7535 |

Figure 2:
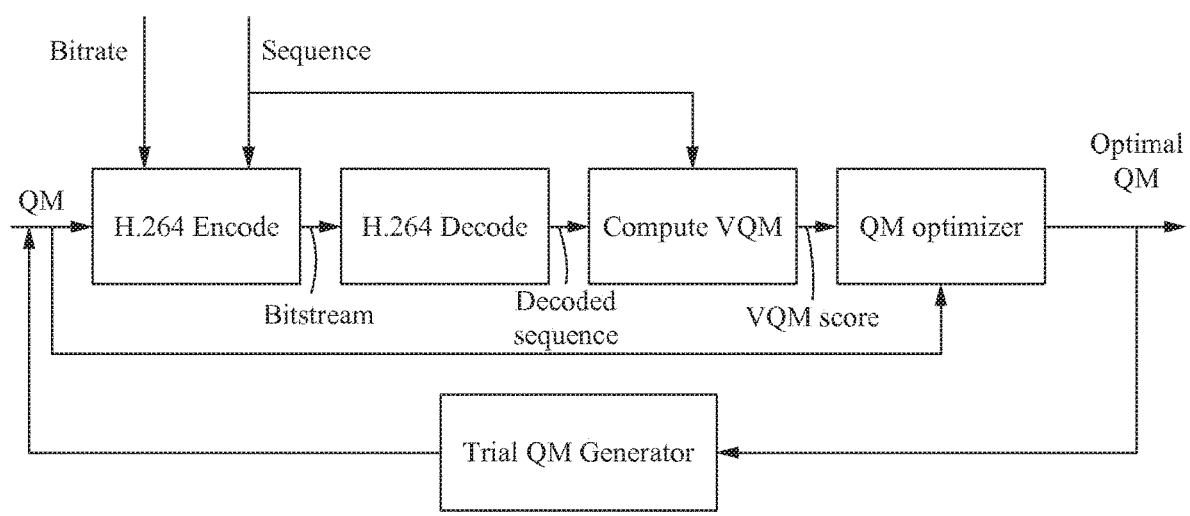
FIG. 2 illustrates a video codec according to some embodiments.

A Downhill Simplex Search (DSS) method is used to find the optimal Q-Matrix in a video codec. FIG. 2 shows a video codec according to some embodiments.

FIG. 3 illustrates comparative Q-matrices (intra 4×4) according to some embodiments. Shown include an HVS-based matrix, an AVC model, an EQM AVC-HR matrix and an AVC "Soft" HVS models matrix. FIG. 4 illustrates comparative Q-matrices (inter 4×4) according to some embodiments. The Q-matrices include a quadratic model matrix, an AVC model matrix, an EQM AVC-HR matrix, a MobilyGen matrix and an AVC "Soft" HVS models matrix. FIG. 5 illustrates comparative Q-matrices (intra 4×4) DCT/DST or DST/DCT according to some embodiments. FIG. 6 illustrates comparative Q-matrices (intra 8×8) according to some embodiments. The Q-matrices include an HVS-based matrix (qp=16) an HVS-based matrix (qp=12), an MPEG-4 ASP matrix, an EQM AVC-HR matrix, an AVC "Soft" HVS models matrix and an AVC model matrix. FIG. 7 illustrates comparative Q-matrices (inter 8×8) according to some embodiments. The Q-matrices include a quadratic model matrix, an AVC model matrix, a MobilyGen Luma matrix, an EQM AVC-HR matrix, and an AVC "Soft" HVS models matrix.

Quadratic Parameter Models

4×4 and 8×8 inter and intra Q-matrices are able to be derived using AVC default matrices as references. 8×8 inter models are able to be used to generate 16×16 and 32×32 inter Q-matrices.

New Inter Q-Matrix Modeling

Start from HVS intra q-matrices for 4×4, 8×8 (or 16×16 or 32×32) matrices, where these matrices could be diagonally symmetric or non-symmetric. Use intra→inter Q-matrix conversion model to convert the intra Q-matrix to inter Q-matrix. For example, build the first row, first column, last row, last column and diagonal elements. Next use zig-zag scan-based interpolation techniques to build up the remaining elements of the Q-matrix.

Quadratic Model for Q-matrix

For the symmetric quadratic model:

$q(x,y)$=unsigned char($a(x*x+y*y)+bxy+c(x+y)+d+0.5$)

AVC default matrix values are able to be used to derive (a, b, c, d) parameters for intra/inter cases FIG. 8 illustrates 4×4 HVS Q-matrices generated using quadratic parameters according to some embodiments. FIG. 9 illustrates 4×4 HVS Q-matrices generated using quadratic parameters according to some embodiments.

HVS properties are able to be used to correct shortcomings of mathematical models such as MSE. HVS is less sensitive to details in areas with high amount of texture activities, and more noise is able to be tolerated in regions of a frame which are highly textured. More noise is able to be hidden in darker or brighter areas when compared to the intensity adapted by HVS. HVS acts as a band-pass filter in terms of spatial frequency response. A peak at around 8 cycles per degree of visual angle. More noise is able to be hidden in areas with higher spatial frequencies. Object boundaries are able to be preserved. HVS is very sensitive to unpreserved edges of rigid objects especially in the presence of motion in video sequences. Usually, a bad selection of a motion vector or an inappropriate choice for coding mode is the main cause for edge misalignment of a solid object in the scene. This type of distortion is more likely to occur at low bit rates. HVS is able to be used for macroblock classification and perceptual model-based bit-rate control. Macroblocks are able to be classified as textured, dark contrast, smooth, edge, detailed or normal. R-D based qP parameter adjustment (not Q-matrix) is able to be implemented.

Conversion of HVS Model Based Q-matrices: Intra→Inter

For the conversion, the input includes HVS intra quantization matrices (QM_hvs_intra) such as 4×4, 8×8, 16×16 or 32×32. AVC matrix models are used to perform the conversion. The output is HVS-based inter quantization matrices (QM_hvs_inter).

The intra→inter Q-matrix (square) conversion algorithms include:

a) 3 linear equations for Q-matrix conversion.
b) Slope_1st=0.714285714; slope_last=0.733333333; slope_diag=0.722222222 (not used for symmetric matrices)
c) $1^{st}$ row/column: intra→inter:
QM_hvs_inter[0][0]=QM_hvs_intra[0][0];
for (n=1; n<BLK_Y; n++) QM_hvs_inter[0][n]=QM_hvs_inter[0][n−1]+(unsigned char) (slope_1st*(float) (QM_hvs_intra[0][n]−QM_hvs_intra[0][n−1]+0.5);
d) last row/column: intra→inter:
QM_hvs_inter[0][BLK_Y−1]=QM_hvs_intra[0][BLK_Y−1];
for (m=1; m<BLK_X; m++) QM_hvs_inter[m][BLK_Y−1]=QM_hvs_inter[m−1][BLK_Y−1]+(unsigned char) (slope_last*(float) (QM_hvs_intra[m][BLK_Y−1]−QM_hvs_intra[m−1][BLK_Y−1])+0.5);
e) remaining data due to symmetry;
for (m=1); m<BLK_X; m++)
For(n=0; n<BLK_Y−1; n++)
QM_hvs_inter[m][n]=QM_hvs_inter[m−1][n+1];

Rectangular Q-Matrix Generation

HVS models are used to generate intra Q-matrices (BLK_X×BLK_Y) which are able to be 16×4, 32×8, 8×2, 32×2.

As BLK_Y<BLK_X, the y-direction component frequency has the dominant contribution for the Q-matrices (y-frequency grid is larger):

```
for (m=0; m<BLK_X; m++) { for n=0; n<BLK_Y; n++) {
  //compute frequencies: fm, fn, fmn
  fm = R[m] / (delta_par * 2.0 * BLK_X);
  fn = C[n] / (delta_par * 2.0 * BLK_Y);
  fmn = squrt (fm * fm + fn * fn);
  fmn = fm_factor * fmn; }}
```

Row-wise (x-direction) function, R[m] has repetitive data (#of sign-changes per row). For example, for 16×4, R[m] {0 1 2 3 3 3 2 1 0 1 2 3 3 3 2 1}; C[n]={0 1 2 3};

Rectangular Q-matrices have repetitive rows due to R[m] function.

HVS model-based Q-matrix conversion (intra→inter)

There are only 2 inter Q-matrices for HEVC (16×4 and 32×8).

Some ad-hoc conversion rules are followed due to the asymmetric nature. The $1^{st}$ row equation is used for 1st half of the rows, and last row equation is used for $2^{nd}$ half of the rows. No symmetry rule is followed.

Figure 10:
FIG. 10 illustrates intra and inter Q-matrices according to some embodiments.
Figure 10:

FIG. 10 illustrates intra and inter Q-matrices according to some embodiments. FIG. 11 illustrates intra and inter Q-matrices (16×4) according to some embodiments.

Q-Matrix Designs

A Q-matrix (square-shaped, symmetric) is able to be designed by using either of two different models.

In the HVS-based design, intra Q-matrices are designed using HVS, and then inter Q-matrices are designed by using intra→inter relationship derived from AVC Q-matrices of 8×8 blocks.

In the Quadratic parameters-based design, two types of reference input Q-matrices are used to derive quadratic parameter-sets: HVS model-based Q-matrices and AVC 4×4 and 8×8 Q-matrices, and 16×16 and 32×32 Q-matrices interpolated from 8×8 Q-matrix. Then, quadratic parameter sets are used to generate output Q-matrices.

A non-square, Q-Matrix is generated from a square Q-matrix. Selective columns/rows are picked. Both HVS and quadratic parameter-based Q-matrices are used as input Q-matrices.

Quadratic Parameter Modeling

A Least Squares (LS) curve fitting is used to derive quadratic parameters, p. A simple linear matrix equation (multiplication of fixed 4×4 matrix and a source Q-matrix data-dependent 4×1 array) are used:

P=[a b c d]'=C·q, where

C, a fixed 4×4 matrix pre-computed for a given block-size (N1×N2=N)

q, a 4×1 array containing weighted sum of linear-form ($g_i$, i=0 to N−1) of source Q-Matrix elements and the corresponding ($x_i$, $y_i$) coordinates.

($G_i$, i=0 to N−1) is derived from the linearized input Q-matrix elements

Source Q-matrices (Input) for Parametric Modeling.

Intra/inter symmetric square and non-square matrices are determined with 2 design models (HVS model-based and AVC and AVC-type). Matrix sizes include: 4×4, 8×8, 16×16, 32×32.

Output Q-matrix Design Using Quadratic Parameters

Design the output Q-matrix using a symmetric quadratic equation:

$$Q(x_i, y_i) = (a*(x_i^2 = y_i^2) + b(x_i \cdot y_i) + c*(x_i + y_i) + d + 512) >> 10;$$

($x_i$, $y_i$) is location coordinates in the Q-matrix, arranged in an array form (i=0 to N−1);

p=[a, b, c, d]' forms the quadratic parameters column-array.

TABLE 3

Derived Quadratic parameters for HVS Q-matrices

| Q-matrices | Types | a | b | c | d |
|---|---|---|---|---|---|
| 4 × 4 | Intra | 2048 | 3768 | −6164 | 15647 |
| | Inter | 1536 | 2601 | −4209 | 14582 |
| 8 × 8 | Intra | 619 | 1277 | −4904 | 20249 |
| | Inter | 497 | 873 | −3587 | 18240 |
| 16 × 16 | Intra | 171 | 369 | −3039 | 23826 |
| | Inter | 136 | 236 | −2125 | 20542 |
| 32 × 32 | Intra | 45 | 99 | −1689 | 26059 |
| | Inter | 34 | 59 | −1076 | 21072 |

TABLE 4

Derived Quadratic parameters for AVC-type Q-matrices

| Q-matrices | Types | a | b | c | d |
|---|---|---|---|---|---|
| 4 × 4 | Intra | −256 | −901 | 8264 | 5652 |
| | Inter | −192 | −563 | 5440 | 9907 |
| 8 × 8 | Intra | −56 | −127 | 3364 | 6898 |
| | Inter | −28 | −50 | 2070 | 11260 |
| 16 × 16 | Intra | −14 | −32 | 1682 | 6898 |
| | Inter | −7 | −13 | 1035 | 11260 |
| 32 × 32 | Intra | −4 | −8 | 841 | 6898 |
| | Inter | −2 | −3 | 517 | 11260 |

Figure 12:
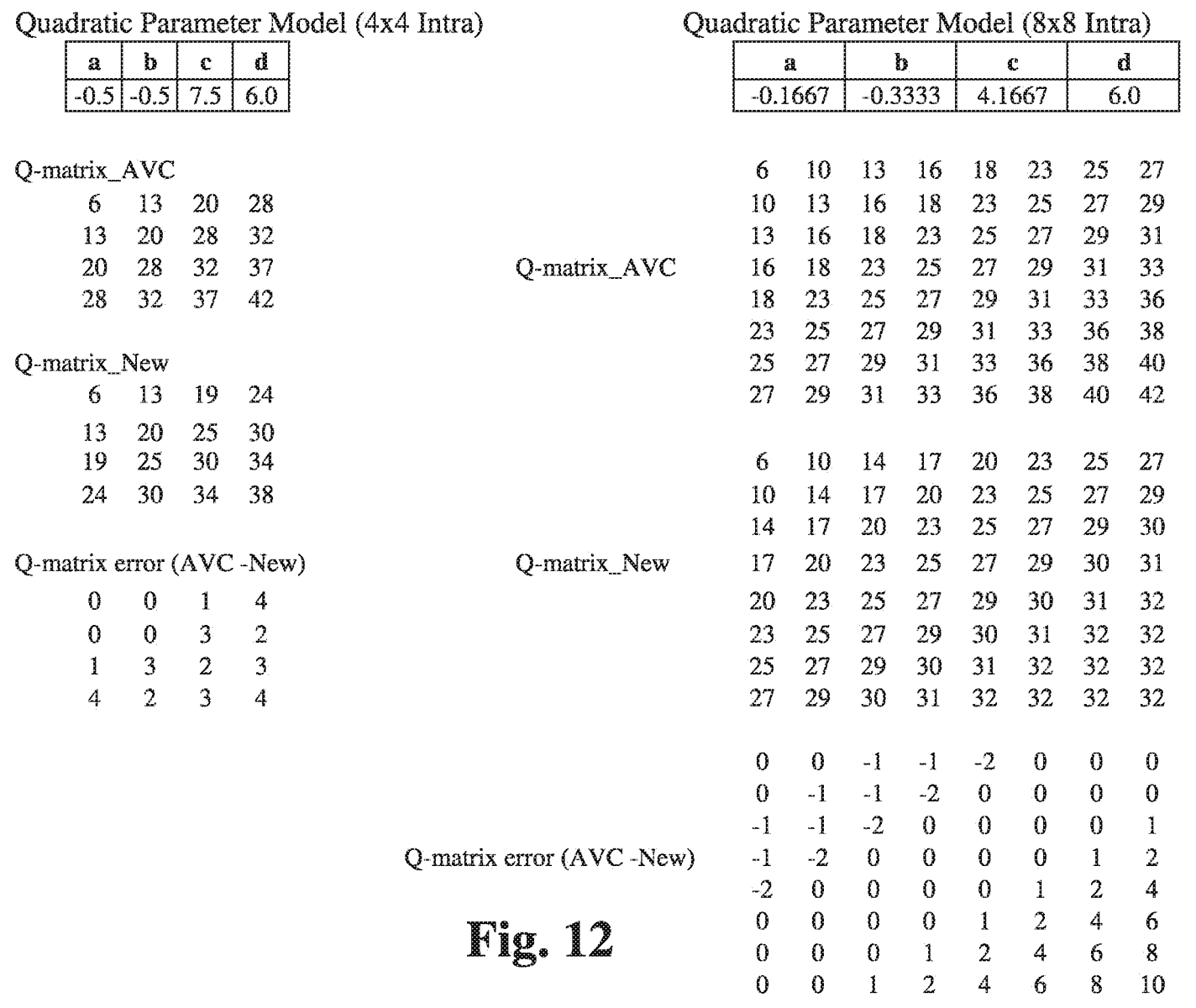

FIG. 12 illustrates results for intra quadratic models according to some embodiments. FIG. 13 illustrates results for inter quadratic models according to some embodiments.

Figure 14:
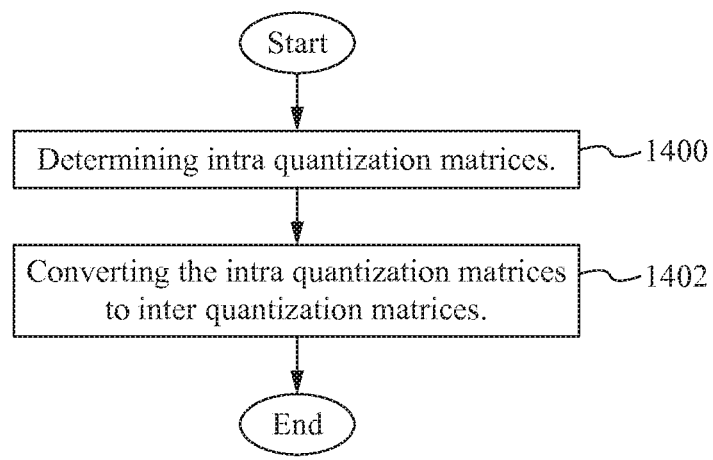
FIG. 14 illustrates a flowchart of a method of implementing a quantization matrix design according to some embodiments.

FIG. 14 illustrates a flowchart of a method of implementing a quantization matrix design according to some embodiments. In the step 1400, intra quantization matrices are determined. In the step 1402, the intra quantization matrices are converted into corresponding inter quantization matrices. In some embodiments, intra quantization matrices are determined for square-shaped blocks and rectangular-shaped blocks. In some embodiments, the conversion from intra square-shaped quantization matrices to inter quantization matrices is by using reference AVC Q-matrix model based algorithms. In some embodiments, the conversion from intra rectangular-shaped quantization into the corresponding inter rectangular-shaped quantization matrices is by using reference AVC Q-matrix model based algorithms applied to a number of matrix-rows due to repetitive nature of them. In some embodiments, for the HVS model, contrast sensitivity functions adjustment-based algorithms are used extensively to derive intra quantization matrices. In some embodiments, for quadratic parameter quantization matrix design, a set of quadratic parameters list is generated by using reference input quantization matrices from HVS models or AVC reference quantization matrices as input matrices. Subsequently, these newly derived quadratic parameters are used to generate quadratic model-based quantization matrices by using a quadratic equation. In some embodiments, fewer or more steps are implemented.

Figure 15:
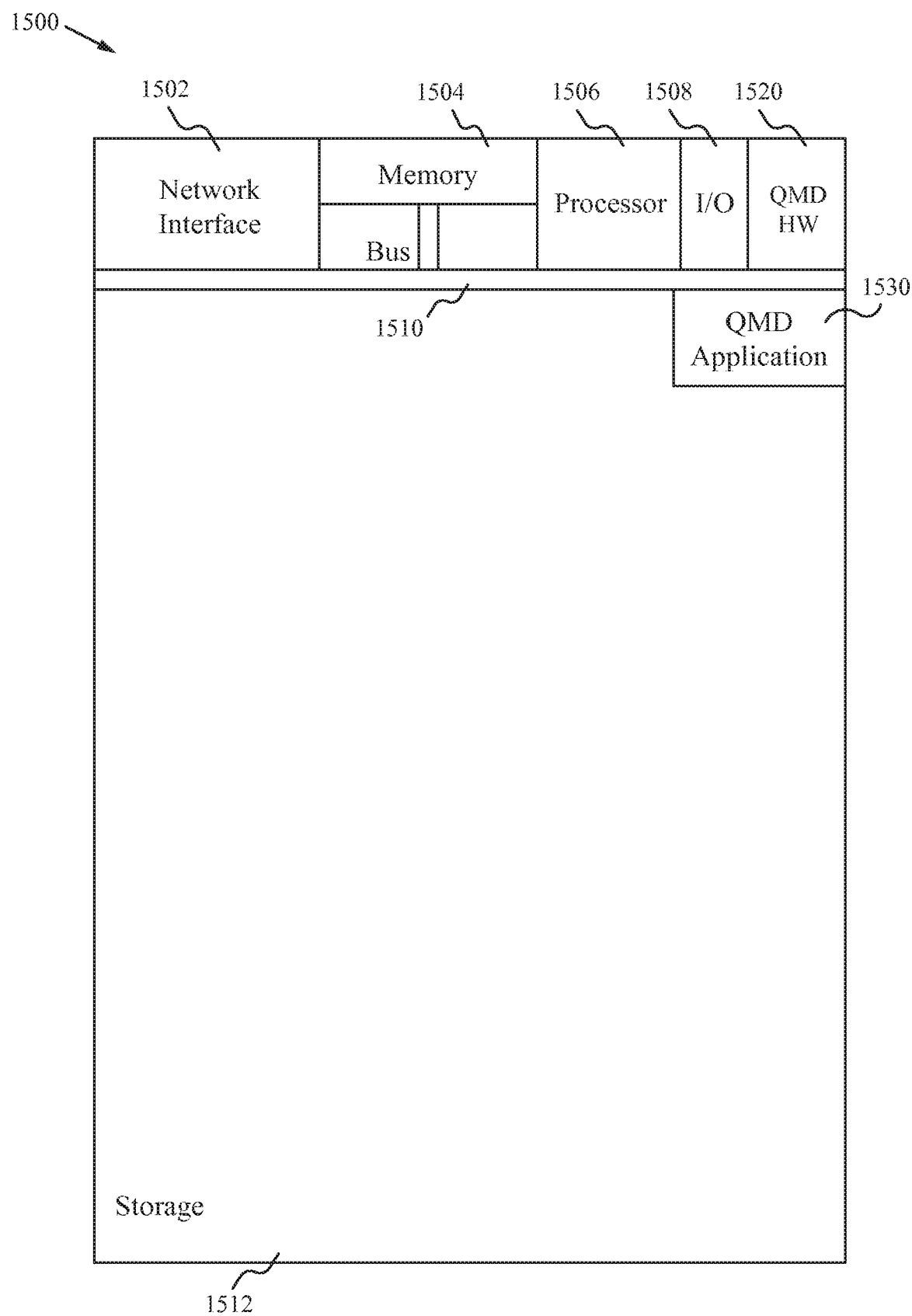
FIG. 15 illustrates a block diagram of an exemplary computing device configured to implement the quantization matrix design according to some embodiments.

FIG. 15 illustrates a block diagram of an exemplary computing device 1500 configured to implement the quantization matrix design according to some embodiments. The computing device 1500 is able to be used to acquire, store, compute, process, communicate and/or display information such as images, videos and audio. For example, a computing device 1500 is able to be used to acquire and store a video. The quantization matrix design is typically used during or after acquiring a video. In general, a hardware structure suitable for implementing the computing device 1500 includes a network interface 1502, a memory 1504, a processor 1506, I/O device(s) 1508, a bus 1510 and a storage device 1512. The choice of processor is not critical as long as a suitable processor with sufficient speed is chosen. The memory 1504 is able to be any conventional computer memory known in the art. The storage device 1512 is able to include a hard drive, CDROM, CDRW, DVD, DVDRW, Blu-Ray®, flash memory card or any other storage device. The computing device 1500 is able to include one or more network interfaces 1502. An example of a network interface includes a network card connected to an Ethernet or other type of LAN. The I/O device(s) 1508 are able to include one or more of the following: keyboard, mouse, monitor, display, printer, modem, touchscreen, button interface and other devices. In some embodiments, the hardware structure includes multiple processors and other hardware to perform parallel processing. Quantization matrix design application(s) 1530 used to perform quantization matrix design are likely to be stored in the storage device 1512 and memory 1504 and processed as applications are typically processed. More or fewer components shown in FIG. 15 are able to be included in the computing device 1500. In some embodiments, Quantization matrix design hardware 1520 is included. Although the computing device 1500 in FIG. 15 includes applications 1530 and hardware 1520 for implementing the quantization matrix design, the quantization matrix design is able to be implemented on a computing device in hardware, firmware, software or any combination thereof. For example, in some embodiments, the quantization matrix design applications 1530 are programmed in a memory and executed using a processor. In another example, in some embodiments, the quantization matrix design hardware 1520 is programmed hardware logic including gates specifically designed to implement the method.

In some embodiments, the quantization matrix design application(s) 1530 include several applications and/or modules. In some embodiments, modules include one or more sub-modules as well.

Examples of suitable computing devices include a personal computer, a laptop computer, a computer workstation, a server, a mainframe computer, a handheld computer, a personal digital assistant, a cellular/mobile telephone (e.g. an iPhone®), a smart appliance, a gaming console, a digital camera, a digital camcorder, a camera phone, a portable music device (e.g. an iPod®), a tablet computer (e.g. an iPad®), a video player, a DVD writer/player, a Blu-ray® writer/player, a television, a home entertainment system or any other suitable computing device.

To utilize the quantrization matrix design, a device such as a digital camera is able to be used to acquire a video or image. The quantization matrix design is automatically used for performing image/video processing. The quantization matrix design is able to be implemented automatically without user involvement.

In operation, the quantization matrix design enables faster processing of information and reducing storage space requirements. Potential applications of this implementation include use with the HEVC codec.

In comparison, HVS model-based scaling list matrices performed better than the HM5.0 4×4 and 8×8 default matrices. The default scaling list matrices in HM5.0 include 4×4/8×8 AVC and 16×16/32×32 HVS model-based matrices. The 4×4/8×8 AVC scaling list matrices in HM5.0 are replaced with the corresponding HVS-model based matrices in the Draft International Standard (DIS). The 4×4 and 8×8 HVS model-based matrices are developed using the HVS modeling method as done in the HM5.0 default 16×16 and 32×32 scaling list matrices. While comparing with HM 5.0 default AVC scaling list matrices, the performance of the 4×4 and 8×8 HVS only matrices provide BD bit-rate reduction of 6.5% (AI-HE), 3.6% (RA-HE) and 1.8% (LD-B-HE).

SOME EMBODIMENTS OF QUANTIZATION MATRIX DESIGN FOR HEVC STANDARD

1. A method of implementing a quantization matrix design for high efficiency video coding programmed in a memory of a device comprising:
   a. determining intra quantization matrices of square-shaped blocks; and
   b. converting the intra quantization matrices of the square-shaped blocks into corresponding inter square-shaped quantization matrices.

2. The method of clause 1 further comprising determining intra quantization matrices of rectangular-shaped blocks.

3. The method of clause 2 further comprising converting the intra quantization matrices of the rectangular-shaped blocks into corresponding inter rectangular-shaped quantization matrices.

4. The method of clause 1 wherein converting comprises using reference advanced video coding quantization matrices model-based algorithms.

5. The method of clause 1 wherein the intra quantization matrices are derived from contrast sensitivity functions adjustment-based algorithms.

6. The method of clause 1 wherein the intra quantization matrices are selected from the group consisting of 4×4, 8×8, 16×16 and 32×32.

7. The method of clause 2 wherein the intra quantization matrices are selected from the group consisting of 16×4, 32×8, 8×2 and 32×2.

8. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an portable music player, a tablet computer, a video player, a DVD writer/player, a Blu-ray writer/player, a television and a home entertainment system.

9. A method of implementing a quantization matrix design for high efficiency video coding programmed in a memory of a device comprising:
   a. determining intra quantization matrices of square-shaped blocks and the intra quantization matrices of rectangular-shaped blocks; and
   b. converting the intra quantization matrices of the square-shaped blocks into corresponding inter square-shaped quantization matrices and the intra quantization matrices of the rectangular-shaped blocks into corresponding inter rectangular-shaped quantization matrices.

10. The method of clause 9 wherein converting comprises using reference advanced video coding quantization matrices model-based algorithms.

11. The method of clause 9 wherein the intra quantization matrices are derived from contrast sensitivity functions adjustment-based algorithms.

12. The method of clause 9 wherein the intra quantization matrices are selected from the group consisting of 4×4, 8×8, 16×16 and 32×32.

13. The method of clause 9 wherein the intra quantization matrices are selected from the group consisting of 16×4, 32×8, 8×2 and 32×2.

14. The method of clause 9 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an portable music player, a tablet computer, a video player, a DVD writer/player, a Blu-ray writer/player, a television and a home entertainment system.

15. An apparatus comprising:
   a. a memory for storing an application, the application for:
      i. determining intra quantization matrices of square-shaped blocks; and ii. converting the intra quantization matrices of the square-shaped blocks into corresponding inter square-shaped quantization matrices; and b. a processing component coupled to the memory, the processing component configured for processing the application.

16. The apparatus of clause 15 further comprising determining intra quantization matrices of rectangular-shaped blocks.

17. The apparatus of clause 16 further comprising converting the intra quantization matrices of the rectangular-shaped blocks into corresponding inter rectangular-shaped quantization matrices.

18. The apparatus of clause 15 wherein converting comprises using reference advanced video coding quantization matrices model-based algorithms.

19. The apparatus of clause 15 wherein the intra quantization matrices are derived from contrast sensitivity functions adjustment-based algorithms.

20. The apparatus of clause 15 wherein the intra quantization matrices are selected from the group consisting of 4×4, 8×8, 16×16 and 32×32.

21. The apparatus of clause 16 wherein the intra quantization matrices are selected from the group consisting of 16×4, 32×8, 8×2 and 32×2.

22. The apparatus of clause 15 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an portable music player, a tablet computer, a video player, a DVD writer/player, a Blu-ray writer/player, a television and a home entertainment system.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method, comprising:
   determining intra quantization matrices (QM_hvs_intra) of square-shaped blocks; and
   converting the intra quantization matrices of the square-shaped blocks into correspondingly-sized inter square-shaped quantization matrices (QM_hvs_inter) according to the following conversion:
   (i) for $_{1st}$ row/column:
   QM_hvs_inter[0][0]=QM_hvs_intra[0][0];
   for (n=1; n<BLK_Y; n++)
   QM_hvs_inter[0][n]=QM_hvs_inter[0][n−1]+(unsigned char) (slope_1st*(float)
   (QMhvsintra[0][n]−QMhvs_intra[0][n−1])+0.5);
   (ii) for last row/column:
   QM_hvs_inter[0][BLK_Y−1]=QM_hvs_intra[0][BLK_Y−1];
   for (m=1; m<BLK_X; m++)
   QM_hvs_inter[m][BLKY−1]=QM_hvs_inter[m−1][BLKY−1]+(unsigned char) (slopelast*(float)
   (QMhvsintra[m][BLKY−1]−QM_hvs_intra[m−1][BLKY−1])+0.5); and
   (iii) remaining data due to symmetry;
   for (m=1); m<BLK_X; m++)
   for(n=0; n<BLK_Y−1; n++)
   QM_hvs_inter[m][n]=QM_hvs_inter[m−1][n+1];
   Where:
   slope_1st=0.714285714;
   slope_last=0.733333333;
   BLK X is a matrix size in x direction;
   BLK_Y is a matrix size in y direction; and
   n, m are counter variables.

2. The method of claim 1, further comprising determining intra quantization matrices of rectangular-shaped blocks.

3. The method of claim 2, further comprising converting the intra quantization matrices of the rectangular-shaped blocks into corresponding inter rectangular-shaped quantization matrices.

4. The method of claim 3, wherein the intra quantization matrices are selected from the group consisting of 4×4, 8×8, 16×16, and 32×32.

5. The method of claim 3, wherein the intra quantization matrices are selected from the group consisting of 16×4, 32×8, 8×2, and 32×2.

6. An apparatus, comprising:
   a memory configured to store an application; and
   a processor configured to execute the application to:
   determining intra quantization matrices (QM_hvs_intra) of square-shaped blocks; and
   converting the intra quantization matrices of the square-shaped blocks into correspondingly-sized inter square-shaped quantization matrices (QM_hvs_inter) according to the following conversion:
   (i) for $_{1st}$ row/column:
   QM_hvs_inter[0][0]=QM_hvs_intra[0][0];
   for (n=1; n<BLK_Y; n++)
   QM_hvs_inter[0][n]=QM_hvs_inter[0][n−1]+(unsigned char) (slope_1st*(float)
   (QMhvsintra[0][n]−QMhvs_intra[0][n−1])+0.5);
   (ii) for last row/column:
   QM_hvs_inter[0][BLK_Y−1]=QM_hvs_intra[0][BLK_Y−1];
   for (m=1; m<BLK_X; m++)
   QM_hvs_inter[m][BLKY−1]=QM_hvs_inter[m−1][BLKY−1]+(unsigned char) (slopelast*(float)
   (QMhvsintra[m][BLKY−1]−QM_hvs_intra[m−1][BLKY−1])+0.5); and
   (iii) remaining data due to symmetry;
   for (m=1); m<BLK_X; m++)
   for(n=0; n<BLK_Y−1; n++)
   QM_hvs_inter[m][n]=QM_hvs_inter[m−1][n+1];
   Where:
   slope_1st=0.714285714;
   slope_last=0.733333333;
   BLK X is a matrix size in x direction;
   BLK_Y is a matrix size in y direction; and
   n, m are counter variables.

7. The apparatus of claim 6, wherein the processor is further configured to execute the application to determine intra quantization matrices of rectangular-shaped blocks.

8. The apparatus of claim 7, wherein the processor is further configured to execute the application to convert the intra quantization matrices of the rectangular-shaped blocks into corresponding inter rectangular-shaped quantization matrices.

9. The apparatus of claim 6, wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an portable music player, a tablet computer, a video player, a DVD writer/player, a Blu-ray writer/player, a television, and a home entertainment system.

\* \* \* \* \*